United States Patent Office 2,769,702
Patented Nov. 6, 1956

2,769,702

HERBICIDAL COMPOSITION

Frank J. Sowa, Cranford, N. J.

No Drawing. Application February 9, 1952,
Serial No. 270,901

14 Claims. (Cl. 71—2.2)

This invention relates to herbicidal compositions and is directed particularly to compositions and methods for killing brush, weeds and plants along highways and the rights of way of railroads and power lines.

Many types of herbicidal compositions are known but they are frequently expensive to employ in a concentration sufficiently great to destroy vigorous plants such as scrub oak, poison ivy, sumac and other bushes and plants which grow rapidly along highways and the rights of way of power lines and railroads. Furthermore, many of the compositions heretofore used leave the dead plants or bushes in a highly inflammable condition which tends to increase the fire hazard in such areas.

In accordance with the present invention, compositions are provided which have been found to be very effective in killing plants such as scrub oak, poison ivy and sumac as well as other plants and weeds. At the same time, the compositions are capable of use in such concentrations as to make their application economical and they further have the advantage of rendering the plants which they destroy relatively non-inflammable so that the fire hazard is greatly reduced. By suitable control of the concentration, compositions of the present invention also can be used for sterilization of the soil along rights of way and on tennis courts, ball fields and driveways.

The principal active ingredients in compositions embodying the present invention are the ammonium and amine salts of fluosilicic acid such as ammonium silicofluoride $(NH_4)_2SiF_6$ and triethylamine silicofluoride $[(C_2H_5)_3NH]_2SiF_6$. However, other agents may be used with the silicofluoride salts and in some instances apparently exert a synergistic effect in that they increase the plant killing action of the salts rendering it possible to use smaller quantities of these agents in any particular application. Such added agents may be selected from the ammonium and amine salts and the esters of chlorophenoxy acetic acid such as the salts of 2,4-dichlorophenoxy acetic acid (herein referred to as "2,4-D") and the salts of 2,4,5-trichlorophenoxy acetic acid (herein called "2,4,5-T"). It is further found that the use of wetting agents with these compositions is of importance when they are used in the form of an aqueous spray for brush killing.

One of the objects of the present invention is to provide novel herbicidal compositions containing the ammonium or amine salts of fluosilicic acid.

Another object of the invention is to provide herbicidal compositions in which the ammonium and amine salts of fluosilicic acid are employed in combination with an agent which appears to increase the brush killing activity of the fluoride compound and selected from the ammonium and amine salts and the esters of chlorophenoxy acetic acids.

A further object of the invention is to provide novel methods for killing brush, weeds and plants.

Another object of the present invention is to provide a weed killing composition which by control of its application may be used as a soil sterilizing agent or a brush killing agent.

A particular object of the invention is to provide methods of killing brush, weeds and plants whereby the plants are rendered relatively non-inflammable after they have been killed and become dried.

These and other objects and features of the present invention will appear from the following description thereof in which reference is made to preferred compositions and operations which have been cited for the purpose of indicating the nature of the present invention but without intending to limit the invention thereto.

The weed killing compositions of the present invention contain ammonium silicofluoride or an amine silicofluoride as their principal active agent and are preferably applied to brush, plants and weeds in the form of solutions containing from about 1.0 to 15% by weight of the silicofloride salt. When it is desired to effect complete sterilization of the soil along the right of way of a power line or railroad or on tennis courts, baseball diamonds, driveways and elsewhere, the amount of the active ingredients is generally from about 1 to 6 pounds per 100 square feet. For killing brush such as scrub oak, sumac and the like it is usual to employ from ¼ to 1½ pounds of the active agent dissolved in a gallon of water and to spray the foliage and branches of the plants thoroughly. The amount of this solution used per acre will of course vary considerably with the size and type of the brush being killed. Roughly, from 100 to 300 gallons per acre of a solution containing from ½ to 1 pound of the fluosilicic acid salt per gallon is generally adequate for brush killing and is very effective in killing scrub oak.

It is preferable also to employ a wetting agent in combination with the aqueous solution of the silicofluoride salt so as to insure effective spreading and wetting of the surfaces of the plants, leaves and woody portions to which the composition is applied. Substantially any compatible wetting agent may be employed and in this respect non-ionic wetting agents are preferred because of their uniform compatibility with aqueous solutions of silicofluoride salts. Typical non-ionic wetting agents are the polymers of ethylene glycol, polyethylene oxide ethers of fatty alcohols, and similar ethers of alkylated phenols.

It has been discovered that when the salts or esters of chlorophenoxy acetic acid (2,4-D or 2,4,5-T) are added to solutions containing ammonium or amine silicofluoride salts there is a pronounced increase in the brush and weed killing activity of the compositions. Apparently such compounds have a synergistic effect in increasing the weed and brush killing action of the silicofluoride salts rendering it possible to use smaller quantities of the active ingredient and effecting destruction of the brush and plants by translocation as well as direct contact action. Thus, for example, when a solution containing only the fluosilicic acid salt and a wetting agent is applied to a portion only of a plant there generally is only a partial killing effect throughout the area actually contacted by the solution, whereas total destruction takes place, presumably by translocation when the solution contains a phenoxy acetic acid compound in combination with the ammonium or amine salts of fluosilicic acid.

The amount of the ammonium or amine salt of 2,4-D or 2,4,5-T is generally about 1 to 20% of the amount of the salt of fluosilicic acid used or from about 0.01 to 3% of the aqueous solution. The most effective results are obtained when there is used in addition an amount of wetting agent sufficient to reduce the surface tension of the solution below about 50 and preferably to about 40 dynes per centimeter at 23° C. From about 1 to 20% by weight of wetting agent is generally required for this purpose.

It is found that either the amine or the ammonium salt of fluosilicic acid and the amine or ammonium salt of 2,4-D or 2,4,5-T may be employed. There does not appear to be much difference in the activity of either the amine or the ammonium salts of either acid. Various amine salts may be used such as propyl, dimethyl or trimethyl amine, diethyl or triethyl amine, triethanol amine, isopropanol amine or long chain amines such as the lauryl amine salt. The latter salts incidentally possess some action as a wetting agent and render the amount of additional wetting agent required considerably less. The esters of polychlorophenoxy acetic acid also may be used such as the butyl, isopropyl, amyl and octyl esters as well as the esters of monoethyl ether of ethylene glycol and diethylene glycol. The esters in general are less soluble than the ammonium and amine salts of 2,4-D and 2,4,5-T but the wetting agent or added emulsifying agent will serve to retain them in dispersed form.

A typical solution containing ammonium silicofluoride (without any 2,4-D) and adapted for use in killing brush contains 1 pound of ammonium silicofluoride and 1 ounce of wetting agent dissolved in 1 gallon of water. Solutions containing as little as ¼ pound of ammonium silicofluoride per gallon of water have been used with success but generally from ½ to 1½ pounds per gallon are preferred in the absence of any phenoxy acetic acid salt.

A typical solution containing the polychlorophenoxy acetic acid salts and adapted for use in killing brush may contain 1 to 8 ounces of ammonium silicofluoride together with 0.1 to 1 ounce of the ammonium salt of 2,4-D and 1 ounce of wetting agent dissolved in 1 gallon of water. As indicated, in either of the solutions described the amine salts of fluosilicic acid and the amine salts of 2,4-D or 2,4,5-T may be substituted for the ammonium salts.

In order to illustrate a typical application of compositions embodying the present invention for brush killing, the following example is cited.

*Example I*

In 1 gallon of water there were dissolved one quarter pound of ammonium silicofluoride, 1 ounce of the ammonium salt of 2,4-D and 1 ounce of "Igepal 300" which is a liquid form of ethylene glycol condensation product sold as a wetting agent. The solution was applied to a plot having an area of 300 square feet entirely infected with scrub oak in the form of bushes averaging about 3½ feet high. The equipment used was a single nozzle hand sprayer operating under pressures of about 15 to 30 pounds per square inch. The solution was sprayed thoroughly over the leaves and woody portions of the plants in the area treated and after one week substantially all of the vegetation was killed, and in particular, the scrub oak was all found to be dead.

*Example II*

In order to illustrate a typical application of the compositions of the present invention when used as a soil sterilant, 4 pounds of ammonium silicofluoride, 1 ounce of ammonium salt of 2,4-D and 1 ounce of "Igepal 300" were dissolved in 5 gallons of water and sprayed over 300 square feet of turf containing vigorously growing weeds and grasses. Within 4 days the vegetation in the area treated was completely dead and further growth of weeds and plants in the area has been inhibited over a period of two years.

Any of the foregoing solutions may be applied to brush by spraying on the leaves and branches of the plants whereupon the plants are killed within a matter of a few days. In some instances, it is preferable to make two or three applications of the spray to areas to be treated in which case the concentration of the solutions used may be reduced somewhat. Plants and weeds which have been killed by the application of compositions as herein described are characterized by their substantial resistance to fire so that they become relatively non-inflammable and therefore decrease rather than increase the fire hazard resulting from the use of the composition. This characteristic is of particular importance along the rights of way of a railroad or power line where a fire may cause considerable damage. Furthermore, such rights of way frequently extend through remote wooded areas where fires may gain great headway before they are observed. When brush and weeds are killed by the use of the composition herein described, the right of way becomes an effective fire break suppressing the progress of brush and forest fires rather than increasing such hazards as has been the case of the many weed killing compositions heretofore used.

In some instances it is desirable to use the compositions of the present invention in a dry form as a dust or powder for brush killing in which case from 25 to 300 pounds per acre of the active ingredient may be distributed by dusting onto the plants in the area to be treated in admixture with an inert dry powdered material such as clay, bentonite or vermiculite. Ordinarily, in using such a dry dusting powder some form of sticking agent which may also be a wetting agent or a rosin or casein type of adhesive is added to the mixture in amounts varying from 1 to 10 parts by weight of a mixture.

When such dry mixtures are employed for soil sterilization purposes, the active ingredient may be mixed with sand, clay, bentonite or vermiculite and sprinkled or spread over the area to be treated at the rate of from 400 to 2000 pounds of active ingredient per acre. Thereafter, the area treated is preferably wetted down with water. In using either of the dry forms of the present invention, the mixture used generally contains from 1 to 50% of the active ingredient, the balance being the inert dry material.

The composition as prepared for storage and shipment in commerce is preferably in the form of a dry powdered product consisting of a mixture of the ingredients. A typical product has the following composition:

| | Parts |
|---|---|
| Ammonium silicofluoride | 1000 |
| Ammonium salt of 2,4-D | 25 |
| "Igepal 300" | 25 |

The latter material is a non-ionic wetting agent comprising polymers of ethylene glycol. It is a liquid but when mixed with the much larger amount of dry ingredients in the composition the product as a whole is sufficiently dry to be shipped and handled as a powdered product.

In place of the "Igepal 300" a wetting agent in the form of a waxy solid and sold under the name "Emulphor ON" may be used. This composition also comprises the polymers of ethylene glycol and is a non-ionic wetting agent. The dry powdered ethylene glycol polymer sold under the name "Pluronics" may also be used. Other wetting agents may, of course, be used and the amine salts may be substituted for the ammonium salts in the above composition and the salts of 2,4,5-T may be substituted for those of 2,4-D. The esters of the phenoxy acetic acid compounds also may be used. The proportions of the various ingredients may be adjusted considerably and for many purposes the phenoxy acetic acid salt may be eliminated altogether.

It will be apparent from the foregoing description that the herbicides of the present invention may be varied considerably in composition and may be applied in either a liquid or solid form and used either as brush killers or soil sterilants. In view thereof it should be understood that the specific compositions described and their methods of application are intended to be illustrative only and are not intended to limit the scope of the invention.

I claim:

1. An herbicidal composition comprising a compound selected from the group consisting of the ammonium and amine salts of fluosilicic acid in phytotoxic concentration, said composition containing sufficient non-ionic wetting agent to impart to an aqueous solution of the composition containing from 3 to 15% of said compound a surface tension below about 50 dynes per centimeter at 23° C.

2. An herbicidal composition comprising a compound selected from the group consisting of the ammonium and amine salts of fluosilicic acid, and a compound selected from the group consisting of the ammonium and amine salts and the esters of polychlorophenoxy acetic acid, said compounds being present in the composition in concentrations sufficient to render the composition phytotoxic, said composition also containing sufficient non-ionic wetting agent to impart to an aqueous solution of the composition containing from 1 to 15% of the fluosilicic acid compound, a surface tension below about 50 dynes per centimeter at 23° C.

3. An herbicidal composition comprising approximately 1000 parts by weight of a compound selected from the group consisting of the ammonium and amine salts of fluosilicic acid, from about 10 to 200 parts by weight of a compound selected from the group consisting of ammonium and amine salts and the esters of polychlorophenoxy acetic acid and from about 10 to 200 parts by weight of a non-ionic wetting agent, said compounds being present in the composition in concentrations sufficient to render the composition phytotoxic.

4. An herbicidal composition consisting of an aqueous solution containing from about 3 to 15% by weight of a compound selected from the group consisting of the ammonium and amine salts of fluosilicic acid, and sufficient non-ionic wetting agent to impart to said solution a surface tension not exceeding 50 dynes per centimeter at 23° C.

5. An herbicidal composition consisting of an aqueous solution containing from about 1 to 15% by weight of a compound selected from the group consisting of the ammonium and amine salts of fluosilicic acid together with about 0.01 to 3% of a compound selected from the group consisting of the ammonium and amine salts and the esters of polychlorophenoxy acetic acid, and sufficient non-ionic wetting agent to impart to said solution a surface tension not exceeding 50 dynes per centimeter at 23° C.

6. An herbicidal composition consisting of an aqueous solution containing from about ¼ to 1½ pounds per gallon of a compound selected from the group consisting of the ammonium and amine salts of fluosilicic acid, and sufficient non-ionic wetting agent to impart to said solution a surface tension not exceeding 50 dynes per centimeter at 23° C.

7. An herbicidal composition consisting of an aqueous solution containing from about 1 to 8 ounces per gallon of a compound selected from the group consisting of the ammonium and amine salts of fluosilicic acid together with an amount of a compound selected from the group consisting of the ammonium and amine salts and the esters of polychlorophenoxy acetic acid equal to from about 1 to 20% of the weight of the salt of fluosilicic acid, and sufficient non-ionic wetting agent to impart to said solution a surface tension not exceeding 50 dynes per centimeter at 23° C.

8. An herbicidal composition consisting of an aqueous solution containing about 1 pound of ammonium silicofluoride and 1 ounce of a non-ionic wetting agent per gallon of water in the solution.

9. An herbicidal composition consisting of an aqueous solution containing approximately ¼ to ½ pound of ammonium silicofluoride together with from $\frac{1}{10}$ to 1 ounce of the ammonium salt of 2,4-dichlorophenoxy acetic acid per gallon of solution and sufficient non-ionic wetting agent to reduce the surface tension of the solution below about 50 dynes per centimeter at 23° C.

10. The method of killing brush which comprises the steps of spraying on the leaves and woody portions of the plants a solution containing from about ¼ to 1 pound of a compound selected from the group of ammonium and amine salts of fluosilicic acid per gallon of solution, said solution containing sufficient non-ionic wetting agent to reduce the surface tension of the solution below about 50 dynes per centimeter at 23° C.

11. The method of killing brush which comprises the step of spraying an aqueous solution containing from ¼ to 1½ pounds of ammonium silicofluoride per gallon together with sufficient wetting agent to reduce the surface tension of the solution below about 50 dynes per centimeter at 23° C. onto the leaves and woody portions of brush to be killed at the rate of about 100 to 300 gallons per acre.

12. The method of sterilizing soil which comprises the steps of applying ammonium silicofluoride to the surface to be treated at the rate of about 1 to 6 pounds per 100 square feet.

13. The method of sterilizing soil which comprises the steps of spraying onto the area to be treated an aqueous solution containing ammonium silicofluoride and a non-ionic wetting agent at the rate of approximately 1 to 6 pounds of the ammonium silicofluoride per 100 square feet.

14. The method of killing brush which comprises the steps of spraying on the leaves and woody portions of the plants a solution containing from about 1 to 8 oz. per gallon of a compound selected from the group consisting of ammonium and amine salts of fluosilicic acid together with an amount of a compound selected from the group consisting of ammonium and amine salts and the esters of polychlorophenoxy acetic acid equal to about from 1 to 20% of the weight of the salt of fluosilicic acid and sufficient non-ionic wetting agent to impart to said solution a surface tension not exceeding 50 dynes per centimeter at 23° C., the rate of application of the solution being about 100 to 300 gallons per acre.

References Cited in the file of this patent

UNITED STATES PATENTS

| | | |
|---|---|---|
| 2,075,359 | Salzberg et al. | Mar. 30, 1937 |
| 2,277,744 | Cuprey et al. | Mar. 31, 1942 |
| 2,368,275 | Torley | Jan. 30, 1945 |
| 2,390,941 | Jones | Dec. 11, 1945 |
| 2,393,086 | Bousquet | Jan. 15, 1946 |

FOREIGN PATENTS

| | | |
|---|---|---|
| 760,581 | France | Dec. 14, 1933 |
| 572,101 | Germany | Mar. 10, 1933 |

OTHER REFERENCES

J. Amer. Society of Agronomy, vol. 33, (April 1941), page 367.

Chemical Abstracts, vol. 30 (1936), col. 3575 [2], abstract of article of Strachitskii.